(12) United States Patent
Okeda et al.

(10) Patent No.: US 7,536,590 B2
(45) Date of Patent: May 19, 2009

(54) PROGRAMMABLE CONTROLLER, PROGRAMMABLE CONTROLLER SYSTEM, CPU UNIT AND METHOD OF STARTING DUPLEXED OPERATION

(75) Inventors: Hideo Okeda, Mishima (JP); Eisuke Nagano, Kannami (JP); Eiji Nakanishi, Mishima (JP); Kenichiro Tomita, Kannami (JP)

(73) Assignee: OMRON Corporation, Kyoto (JP)

( * ) Notice: Subject to any disclaimer, the term of this patent is extended or adjusted under 35 U.S.C. 154(b) by 580 days.

(21) Appl. No.: 10/950,171

(22) Filed: Sep. 24, 2004

(65) Prior Publication Data

US 2005/0086560 A1    Apr. 21, 2005

(30) Foreign Application Priority Data

Sep. 26, 2003  (JP)  ............................ 2003-335593
Sep. 17, 2004  (JP)  ............................ 2004-272617

(51) Int. Cl.
*G06F 11/00*  (2006.01)
(52) U.S. Cl. ........................................ 714/11; 717/170
(58) Field of Classification Search ................. 714/11; 717/170
See application file for complete search history.

(56) References Cited

U.S. PATENT DOCUMENTS

| | | | |
|---|---|---|---|
| 5,577,232 A * | 11/1996 | Priem et al. ................. | 717/170 |
| 2002/0112052 A1 | 8/2002 | Brittingham et al. | |
| 2002/0188934 A1 * | 12/2002 | Griffioen et al. ............ | 717/170 |
| 2003/0037282 A1 * | 2/2003 | Berg et al. .................... | 714/11 |
| 2003/0105988 A1 * | 6/2003 | Shanbhogue ................. | 714/7 |
| 2003/0145130 A1 * | 7/2003 | Schultz et al. .............. | 709/325 |
| 2004/0181777 A1 * | 9/2004 | Fam ............................ | 717/114 |

FOREIGN PATENT DOCUMENTS

| | | |
|---|---|---|
| JP | 10/040083 | 2/1998 |
| JP | 2001-202101 | 7/2001 |
| WO | 02/39198 A2 | 5/2002 |

OTHER PUBLICATIONS

Ito, et al.; Online System Upgrade on Centum CS FCSs); Yokogawa Technical Report, Yokogawa Electric Co., No. 25, Jun. 1998.
Patent Abstract of Japan, 2000305758, Feb. 11, 2000.
European Search Report, EP04022593, dated Dec. 28, 2004.
Patent Abstracts of Japan, Publication No. 10-097310, *Programmable Controller And Its System*, Ikegami Masaaki, published on Apr. 14, 1998.
Japan patent application No. 2004-272617, Examination Report dated May 2, 2006.

* cited by examiner

*Primary Examiner*—Emerson C Puente
(74) *Attorney, Agent, or Firm*—Weaver Austin Villeneuve & Sampson LLP (57) ABSTRACT

A programmable controller has a first (executing) CPU unit and a second (standby) CPU unit for a duplexed operation. Each CPU unit stores CPU version indicating its functionality and function version indicative of the functionality of the user program stored in itself. Before the duplexed operation is started, the first CPU unit acquires the unit version of the second CPU unit, compares it with the function version stored in itself and judges from this comparison whether a duplexed operation is possible or not. Only if it is judged that the duplexed operation is possible, the first CPU unit copies the user program stored in itself to the second CPU unit together with the function version and the duplexed operation is started.

5 Claims, 6 Drawing Sheets

| CPU VERSION | IMPLEMENTED FUNCTIONS |
|---|---|
| Ver1.0 | A,B,C |
| Ver2.0 | D,E,F |
| Ver3.0 | G |
| Ver4.0 | H,I |

Functions A-C can be executed if CPU version is 1.0.
Functions A-F can be executed if CPU version is 2.0.
Functions A-G can be executed if CPU version is 3.0.
Functions A-I can be executed if CPU version is 4.0.

Fig. 4

| CPU VERSION | FUNCTIONS BEING USED | | | |
|---|---|---|---|---|
| | A-C | A-F | A-G | A-I |
| Ver1.0 | Function version: ver1.0 | NOT USABLE | NOT USABLE | NOT USABLE |
| Ver2.0 | Function version: ver1.0 | Function version: ver2.0 | NOT USABLE | NOT USABLE |
| Ver3.0 | Function version: ver1.0 | Function version: ver2.0 | Function version: ver3.0 | NOT USABLE |
| Ver4.0 | Function version: ver1.0 | Function version: ver2.0 | Function version: ver3.0 | Function version: ver4.0 |

Function version is 1.0 when functions A-C are being used.
Function version is 1.0 when functions A-C are being used.
Function version is 1.0 when functions A-C are being used.
Function version is 1.0 when functions A-C are being used.
CPU versions less than function cannot be used because not implemented to CPU unit.

| Application version | Function name | Where stored |
|---|---|---|
| Ver1.0 | A | UM |
|  | B | IOM |
|  | C | IOM |
| Ver2.0 | D | UM |
|  | E | UM |
|  | F | IOM |
| Ver3.0 | G | IOM |
| Ver4.0 | H | UM |
|  | I | UM |

PROGRAMMABLE CONTROLLER, PROGRAMMABLE CONTROLLER SYSTEM, CPU UNIT AND METHOD OF STARTING DUPLEXED OPERATION

Priority is claimed on Japanese Patent Applications 2003-335593 filed Sep. 26, 2003 and 2004-272617 filed Sep. 17, 2004.

BACKGROUND OF THE INVENTION

This invention relates to programmable controllers, systems using such programmable controllers, a CPU unit for such programmable controllers and methods of starting a duplexed operation of such a programmable controller system.

Programmable controllers are being used as controlling devices for the factory automation set at a production factory (or a production site). Such a programmable controller (PLC) is comprised of a plurality of units, that is, it is formed by appropriately combining units of various types such as a power unit serving as a supply source of electric power, a CPU unit for carrying out the control of the PLC as a whole, an input unit for inputting signals from switches and sensors set at appropriate positions of a production device or an equipment of the factory automation, an output unit for transmitting control outputs to actuators and a communication unit for connecting to a communication network.

The control by the CPU unit of a PLC is carried out by taking in signals inputted by the input unit into the I/O memory of the CPU unit (IN refresh), performing logical calculations based on a user program in a preliminarily registered user program language such as a ladder language (calculation), writing the results of the performed calculations in the I/O memory to thereby transmit them to the output unit (OUT refresh) and to thereafter cyclically repeat peripheral processes such as exchanging data with other PLCs on the communication network through the communication unit or with external apparatus through communication ports on the CPU unit. The IN refresh and the OUT refresh may be sometimes carried out summarily (I/O refresh).

In order to improve system safety and reliability, individual units comprising a PLC are sometimes doubled up, or duplexed. For duplexing a CPU unit (which is one of the objects of this invention), for example, two CPU units having the same functions and being adapted to execute the same user program are provided and connected by a bus.

One of these two CPU units serves as the CPU unit of an executing system (or executing CPU unit) to actually carry out processes cyclically, reading from and writing into a memory, exchanging control data (I/O data) with external I/O devices and controlling a factory automation network system. The other CPU unit becomes the CPU unit of a standby system (or standby CPU unit). Although the CPU unit of a standby system during a standby period carries out the same user program as that of the CPU unit of the executing system, it is not adapted to output the results of its calculations. Instead, it serves to receive results of calculations, etc. from the CPU unit of the executing system and to update the memory content of the CPU unit of the standby system. Thus, the memory contents of the CPU units of the executing system and the standby system can be maintained in the same condition.

When an abnormal condition occurs in the CPU unit of the executing system, the CPU unit of the standby system takes the place of the CPU unit of the executing system to carry out the operations such as the actual control. Thus, the occurrence of an abnormal condition in the CPU unit of the executing system does not cause the system to immediately come to a stop. The system reliability can thus be improved since the system can be operated continuously even in such a situation.

The user program executed by the CPU unit is downloaded by means of a support tool connected to the PLC and stored in the user memory of the PLC (the CPU unit). When the user program stored in the PLC is to be amended, a support tool is connected to the PLC to upload it and after the amendment is effected, the amended new user program is donwloaded again to the PLC. The support tool may be a personal computer or a dedicated peripheral device.

When the CPU unit is duplexed and there are two CPU units, the same user program must be implemented to each of these CPU units. This may be done by downloading the user program to each of the CPU units but this is a troublesome way of implementation because the user will be required to carry out the same downloading process twice. Thus, it has been known to use a support tool to download the user program only to the CPU unit of the executing system and to have it copied to the CPU unit of the standby system by using its copying function.

As production methods become improved and complicated and technologies progress, however, upgraded PLCs with new functions added, as well as new software with improved functions, are introduced. Although the processing speed may be increased and new functions may be added, PLCs of a new version are basically designed to maintain exchangeability with PLCs of prior versions and the functions of PLCs of older versions are directly inherited by those of a new version. Thus, user programs which used to be used by PLCs of an old version can be directly implemented to a PLC of a new version.

When a new version is introduced in connection with an improved function, for example, it often happens that the form remains the same but only the version is updated. Thus, since there may be two CPU units of the same form although their versions are different, the versions of two CPUs implemented for duplexing may be different.

Support tools each correspond individually to a PLC (CPU unit). If a new version of PLC is introduced, the version of the support tool is accordingly updated. In other words, if the new version of PLC has expanded functions, a support tool of the old version cannot correspond to the expanded functions and a new tool becomes necessary in order to support such newly introduced functions. Since the support tool of the new version is designed so as to inherit the functions of the older support tools, the support tools of the new version can be connected to a PLC of the older version to download, create and amend user programs.

Thus, the support tool of a new version is connectable to a PLC of either a new version or an old version, while the support tool of the old version is connectable only to a PLC of the older vision. When PLCs of a new version are introduced, therefore, the new version is arranged such that a support tool of an old version will not be connected to a PLC of the new version to attempt certain support processes such as addition or updating of a user program. This may be done, for example, such that, when a support tool is connected to a PLC, the support tool reads out data on the machine type of the PLC (such as its form and version) through a communication between them, compares them with the data on PLC types that can be served by it and thereby judges whether a connection may be made. This may be done by connecting the PLC and the support tool by means of a communication line such as a serial communication line, issuing a command from the support tool to the PLC to request data on the PLC type and causing the PLC to respond with its own PLC type data. Since the support tool stores a list of PLC types to which it may be connected, it undertakes to compare this list with the PLC type data received as a response from the PLC. Such technology has been disclosed, for example, in Japanese Patent Publication Tokkai 10-97310.

If a support tool as disclosed in aforementioned Japanese Patent Publication Tokkai 10-97310 is employed to download a user program to the CPU unit of the executing system, a user program of the correct version executable by this CPU can be download because the support tool checks the type of this CPU unit. When the user program is copied from the CPU unit of the executing system to the CPU unit of the standby system, however, the support tool cannot check the version of the CPU unit. In a situation where the CPU unit of the executing system is of the new version and the CPU unit of the standby system is of an old version, for example, the user program may be copied but as the copied user program is executed by the CPU unit of the standby system, it may stop the operation or carry out an abnormal operation if a circuit is encountered that cannot be handled by it. As a result, if the CPU unit is switched over to the side of the executing system, the operation of the PLC will be stopped.

The problem described above can be obviated if the form is changed whenever a new version is introduced such that CPUs of the same form will be used, but the number of forms will increase by this method and this will complicate the management of forms by the makers and users and hence is not a practical solution.

SUMMARY OF THE INVENTION

It is therefore an object of this invention to provide a programmable controller and a programmable controller system capable of operating CPU units of an executing system and a standby system under a condition capable of normal duplexed operations as well as a CPU unit and a method of starting a duplexed operation.

A programmable controller according to this invention is characterized as having two CPU units, each of these two CPU units being adapted to know (that is, to operate according to) the status of the other of the CPU units. One of these two CPU units functions as an executing CPU unit, while the other functions as a standby CPU unit. The standby CPU unit is adapted, when the executing CPU unit goes down, to serve as the executing CPU unit and to continue operations of the executing CPU unit. Each one of the two CPU units stores a user program, user program version data based on this user program and unit version data indicative of its functionality. Each of these two CPU units is further characterized as comprising judging means for judging, based on the unit version data of the standby CPU unit and the user program version data stored in the executing CPU unit, whether or not execution of the user program stored in the executing CPU unit is possible by the standby CPU unit, and starting means for starting a duplexed operation by the two CPU units only if the judging means judges that the execution is possible.

In the above, the function version data may be any data indicative of the range of functions provided to the CPU unit, consisting, for example, of a list of names of the functions provided to the CPU unit or numerical data corresponding to such list of function names. Similarly, the user program version data may be any data indicative of the range of functions that should be provided to the CPU unit in order to execute the corresponding user program and this may be a list of names of such functions or numerical data corresponding to such list of function names.

The judging means may be implemented in either of the CPU units (say, the MPU mounted to the executing CPU unit) or in any unit other than the CPU units. If it is to be implemented in a CPU unit, it is preferable to implement it in both of the two CPU units because if the executing CPU unit goes down during a duplexed operation, the standby CPU unit will take the place of the executing CPU unit. If the judging means is implemented to only one of the CPU unit, whether it is the executing or standby CPU unit, the CPU unit with the judging means will make the judgment by obtaining necessary version data (unit version data or user program version data) from the other CPU unit. The role of the aforementioned starting means may be played by the same MPU that serves as the judging means or by a different MPU.

The executing CPU unit has the functions of obtaining the unit version data of the standby CPU unit from the standby CPU unit and judging whether or not the user program stored in itself can be executed by the standby CPU unit by comparing the unit version data of the standby CPU unit obtained by itself with the user program stored in itself. These may be functions of the aforementioned judging means. The executing CPU unit also has the function of copying its user program (stored in itself) to the standby CPU unit together with the user program version data when starting the duplexed operation. With a programmable controller thus structured, it can be judged whether the standby CPU unit can execute the user program from the unit version data of the standby CPU unit and the user program version data based on the user program executed by the executing CPU unit even if the unit version data of the CPU units for the duplexed operation are different. Thus, the duplexed operation is started only if it is certain that the duplexed operation can be carried out, say, by checking at an appropriate timing (such as when the duplexed operation is to be started). In other words, the danger of the standby CPU unit taking the place of the executing CPU unit to continue its operation and to carry out a virtual duplexed operation can be obviated when the executing CPU unit goes down.

It is preferable that the user program version data and the unit version data be numerical data such that it can be easily judged which of the versions is the newest. The user program version data may be function version data indicative of functionality of the user program or application version data that are defined at least by function version data indicative of functionality of the user program and parameter version data identifying levels of parameters set in the CPU units.

In the above, the function version data may be any data adapted to indicate the range of functions which should be provided to a CPU unit for executing the user program. They may comprise list data of the names of the functions or numerical data corresponding to such list data. The parameters include data set by the support tool for making it possible to define basic specifications of the CPU units and the PLC system by software and data related to communication routes when data are exchanged among the PLCs through a plurality of networks. The range in which the PLC system as a whole can operate may be set in a plurality of levels by setting and varying these parameters. Such a range may be set through the list data on the function names or the corresponding numerical data.

In the above, to provide a CPU unit with version data may mean that the version data are stored in an non-volatile memory device or the like or to provide such data, whenever necessary, by generating them from stored data.

It is preferable that the executing CPU unit be adapted to obtain unit version data of the standby CPU unit, compare the obtained unit version data with its own unit version data and to communicate the older unit version data to a support tool connected to the programmable controller and issue to the programmable controller a request for the unit version data. With the CPU units thus structured, the support tool is able to generate a user program according to the older unit version data and download it such that a duplexed operation can be carried out reliably by using such downloaded user program.

A CPU unit, which may be suited to be used in any of the programmable controllers embodying this invention (having unit version data set to indicate its functionality, as described above), may be characterized as storing a user program and comprising data acquiring means for acquiring unit version data of another CPU unit of the programmable controller, and judging means for judging whether or not a user program stored therein can be executed by this another CPU unit by comparing the unit version data of this another CPU unit acquired by the data acquiring means with user program version data based on the user program. It is preferable that such CPU unit have the functions of comparing its own unit version data with the unit version data of the other CPU unit to determine which data are older and responding to a request from a support tool by returning the older of these two.

A method according to this invention of starting a duplexed operation of a programmable controller as described above may be characterized as comprising the steps of preliminarily causing a specified unit of the programmable controller to compare the unit version data of the standby CPU unit and the user program version data stored in the executing CPU unit and thereby judging whether or not it is possible for the standby CPU unit to execute the user program stored in the executing CPU unit and starting the duplexed operation only if it is judged by the step of judging that it is possible.

According to another method embodying this invention, the executing CPU unit is caused to acquire the unit version of the standby CPU from the standby CPU unit, to compare the acquired unit version data of the standby CPU unit with the user program version data provided to itself and to thereby judge whether or not it is possible for the standby CPU unit to execute the user program stored in itself and, if it is judged that it is possible, the executing CPU unit is further caused to copy the user program stored in itself to the standby CPU unit together with the user program version data. The duplexed operation is started thereafter.

Thus, the executing and standby CPU units can be operated in under a correct condition even if the CPU units have different unit versions.

DETAILED DESCRIPTION OF THE INVENTION

Figure 1:
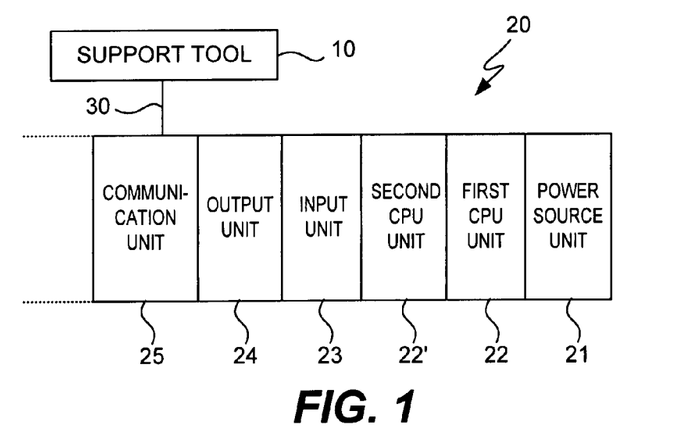
FIG. 1 is a block diagram of a programmable controller system embodying this invention.

FIG. 1 shows a system embodying this invention, comprising a support tool 10 which may be embodied by a personal computer and a programmable controller PLC 20 connected through a network (communication line) 30. The network may be realized by a direct cable connection using a serial line such as RS232C, through which a user program created or amended by the support tool 10 may be downloaded to the PLC 20.

The PLC 20 is comprised of a plurality of units such as a power source unit 21 for supplying electrical power, first and second CPU units 22 and 22' for controlling the PLC 20 as a whole, an input unit 23 for inputting signals from the switches and sensors placed at appropriate positions of a factory automation production equipments, an output unit 24 for outputting control outputs to actuators, etc. and a communication unit 25 connected to a communication network. User programs downloaded from the support tool 10 in the case of this system are stored and executed in the CPU units 22 and 22'. Explained more in detail, the support tool 10 downloads the user programs to the first CPU unit 22 of the executing system and the first CPU unit 22 copies them to the second CPU unit 22' such that the same user programs are stored in both CPU units 22 and 22'.

In other words, the communication line 30 may be connected to the communication unit 25 such that the support tool 10 can make communications through the communication unit 25 or an interface of a serial line may be included in the first CPU unit 22 such that the support tool 10 is directly connected to the first CPU unit 22 for directly downloading user programs. It is to be reminded that the second CPU unit 22' is also adapted to make communications with the support tool 10 although only the communications between the support tool 10 and the first CPU unit 22 have been explained above.

Figure 2:
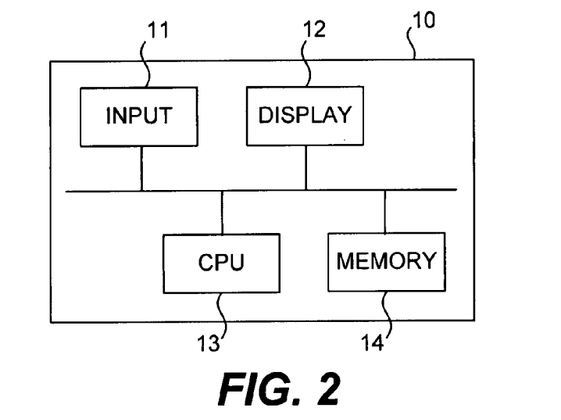
FIG. 2 is a block diagram of the support tool of FIG. 1.

The support tool 10 may be a personal computer, comprising hardware constituents as shown in FIG. 2 including an input device 11 such as a keyboard and a pointing device, a display device 12, a CPU 13 and a memory device 14. User programs implemented to the connected PLC 20 (or its CPU units 22 and 22') are stored in the memory device 14.

Figure 3:
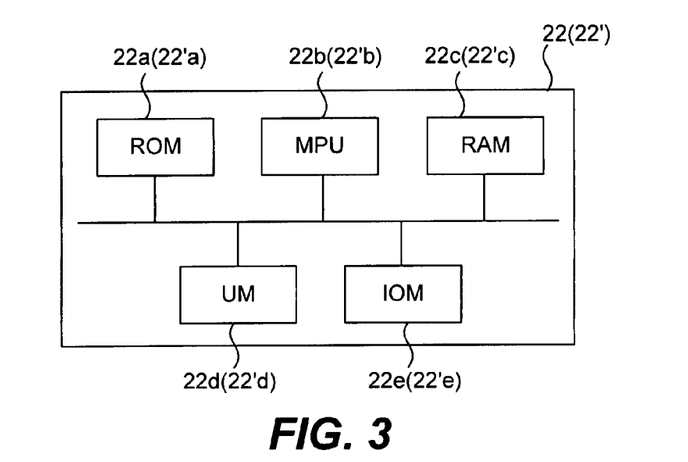
FIG. 3 is a block diagram of a CPU unit.

The internal structure of the CPU units 22 and 22' is as shown in FIG. 3. The system program stored in system ROMs 22a and 22'a is called by an MPU 22b or 22'b adapted to carry out specified processes according to the program by appropriately using system RAMs 22c and 22'c serving as work memories. During the operation, the user program which is one of the user data is stored in user memories UM 22d and 22'd. I/O data and parameters are stored in IO memories (IOM) 22e and 22'e.

As will be explained below in detail, each user program is assigned a function version indicative of its functions. The function version is also a part of the user program and stored in the user memory. Parameters include data that are set by the support tool 10 and adapted to define the basic specification of the CPU unit and the specification of the PLC system by software and data on the communication route when data are exchanged among a plurality of networks. Thus, these parameters may be managed by assigning parameter versions to them to indicate the extent to which they correspond to the specification. From the point of view of the CPU unit as a whole, the specification and level (application version) of an application (system) as a whole can be specified by the function version which indicates the functions of the user program and the parameter versions.

According to an embodiment of this invention, two kinds of versions are prepared, that is, the unit version (CPU version) that represents the range of the functions of a CPU unit and the function version that is the version of the user program. These two kinds of versions are stored in a specified memory of the CPU unit, as will be explained below, and are used to judge the possibility of duplexed operations, etc. The possibility of duplexed operations may be judged by the CPU version and the application version, as will be explained below.

CPU versions may be stored in the system ROM 22a. When a call request is received from the support tool 10, the CPU unit responds by returning these CPU versions to the support tool 10. Function versions are stored in the user memories 22d and 22'd as a part of the user program.

According to the present embodiment of the invention, furthermore, the CPU versions for the individual PLCs (CPU units) and the function versions are represented by numerals and these numbers are incremented as the versions are upgraded. Since it can be said that the larger the numeral, the newer the version, it can be easily judged which of two versions is newer by simply considering their numerical relationship. Since a PLC 20 (the first and second CPU units 22 and 22') of a newer version inherits the functions of an older version, an implemented user program can be handled if the numeral of its function version is smaller than the numeral of the CPU version of one's own. The numerals of the versions may be limited to be an integer (major version) or decimal points may be appropriately incorporated (minor version).

Figure 4:
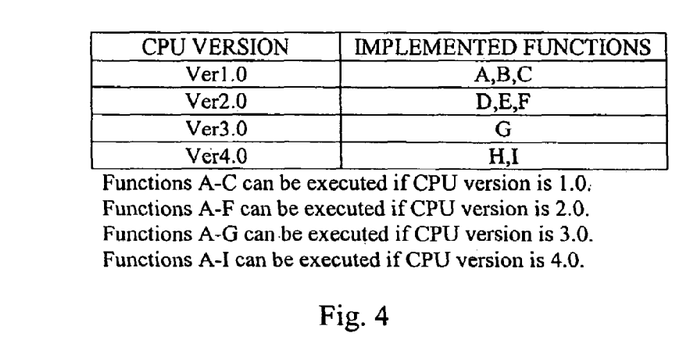
FIGS. 4 and 5 are diagrams for explaining the relationship between CPU versions and their functions.
Figure 5:
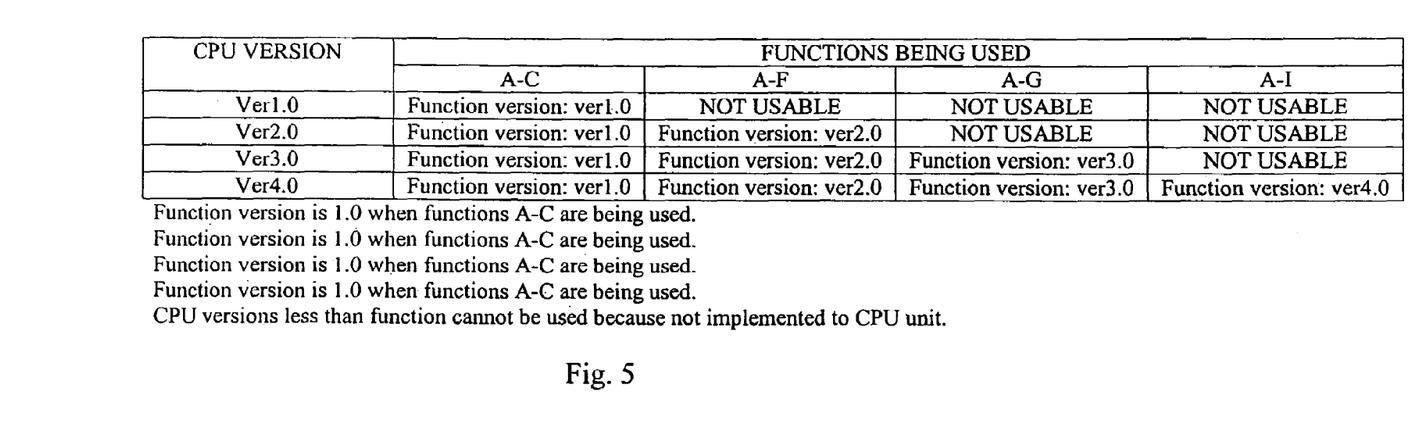

FIGS. 4 and 5 are referenced next to explain the relationship between the function and CPU versions and the inheritance from an older version. FIG. 4 shows the relationship between CPU versions and their functions, showing how the implemented (usable) functions increase as the CPU version is upgraded. The function versions indicative of the usable functions are arranged to match the version number of the CPU version. In other words, if the CPU version is 1.0, functions A-C are executable and the function version of the user program used within the range of functions A-C is 1.0. Similarly, if the CPU version is 2.0, functions A-F are executable and the function version of the user program used within the range of functions A-F becomes 2.0. Thus, a CPU unit with CPU version of 2.0 can execute both user programs with function versions 2.0 and 1.0, as shown in FIG. 5.

Figure 6:
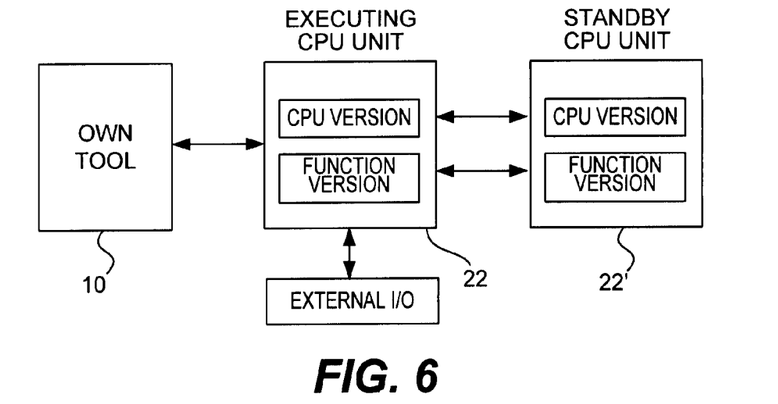
FIG. 6 is a schematic block diagram of a portion of an embodiment of the present invention.

As shown schematically in FIG. 6, furthermore, the first and second CPU units 22 and 22' of the executing and standby systems both have the function of checking and comparing each other's version data. They are also adapted to communicate their version data in response to a request from the support tool 10, as explained above.

Possibility of duplexed operations may be checked at any timing, such as when a part or the whole of a user program stored in the CPU unit of the executing system is modified by an external device or when a parameter of the CPU unit of the executing system has been changed by an external device. It goes without saying that the checking may be effected at any other timing.

Prior to the start of a duplexed operation, the first and second CPU units 22 and 22' thus structured judge whether or not such a duplexed operation can be carried out and perform specified processes according to the result of this judgment. Examples of the timing for starting a duplexed operation include the following:

(1) When both the first and second CPU units 22 and 22' start up such as at the start-up of the power source; and (2) After one of the CPU unit is exchanged due, for example, to a defective condition while the other CPU unit is being operated singly, when the first CPU unit is restarted to return to the condition of duplexed operation.

Figure 7:
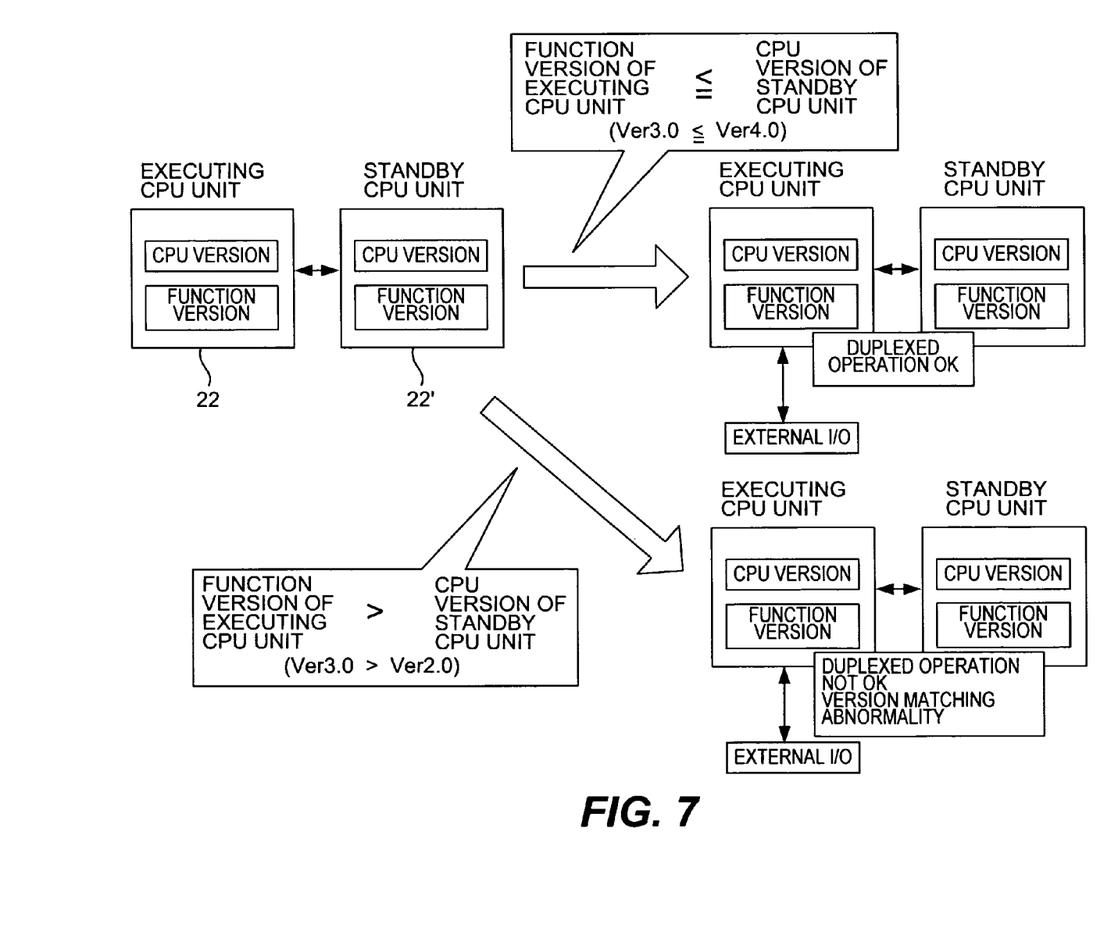
FIG. 7 is a schematic diagram for explaining the operation of a system according to an embodiment of this invention.

As shown in FIG. 7, the function version of the first CPU unit 22 of the executing system and the CPU version of the second CPU unit 22' of the standby system are compared, and if the former is equal to or smaller than the latter, it is judged that a duplexed operation is possible but if the latter is found to be smaller than the former, it is concluded that a duplexed operation is not possible.

If the function version of the CPU unit of the executing system is 3.0 and the CPU version of the CPU unit of the standby system is 4.0, as an example, the CPU unit of the executing system is adapted to carry out functions A-G but the CPU unit of the standby system is adapted to carry out functions A-I. Thus, even if an abnormal condition occurs to the CPU unit of the executing system and the CPU unit of the standby system is switched over into the executing system, it will be capable of carrying out all of the functions and hence the system operation is continued.

If the function version of the CPU unit of the executing system is 3.0 and the CPU version of the CPU unit of the standby system is 2.0, on the other hand, the CPU unit of the executing system is adapted to carry out functions A-G but although the CPU unit of the standby system is adapted to carry out functions A-F, function G cannot be executed by it. Accordingly, if the CPU unit of the executing system goes down and the CPU unit of the standby system takes its place, it cannot execute function G and hence the system comes to a stop.

When the duplexed operation is thus judged impossible to be carried out, it is concluded as a version matching abnormality and a single operation is continued without carrying out the duplexed operation. If the duplexed operation becomes impossible at the time of a power startup, it can be decided through an internal setting whether a single operation is carried out alone by the CPU unit of the executing system or the operation as a whole is stopped.

The processing as described above may be carried out as shown in FIG. 8. As a duplexed operation is started, the CPU unit on the executing side checks the CPU version of the CPU unit of the standby system (Step ST1) by requesting the CPU version of the standby CPU unit. When this request is received, the standby CPU unit responds by communicating its own CPU version to the executing CPU unit (Step ST2).

Figure 8:
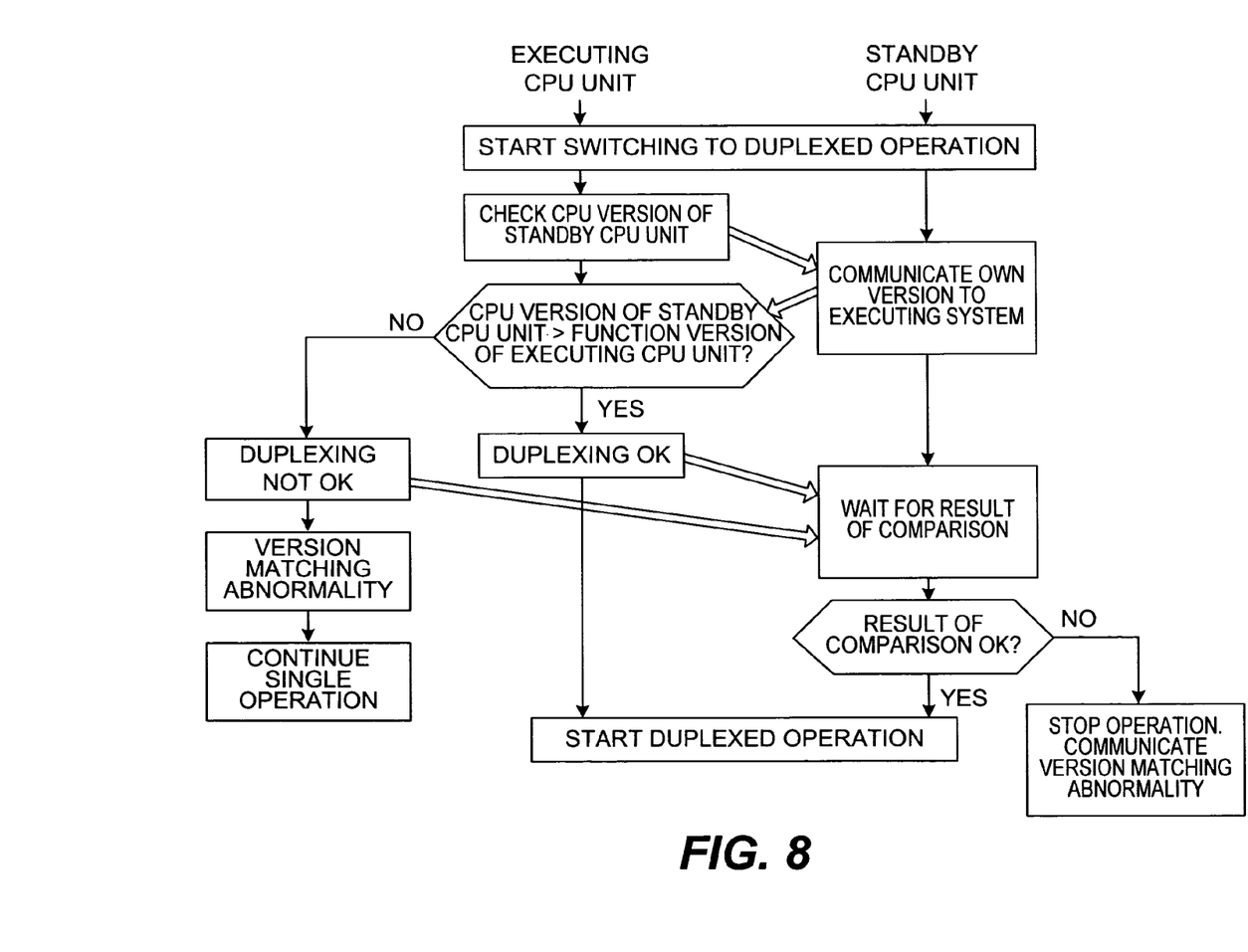
FIG. 8 is a flowchart for explaining the functions of each CPU unit.

Next, the executing CPU unit compares the received CPU version sent from the standby CPU unit with its own function version (Step ST3). If the CPU version of the standby CPU unit is found to be less than its own function version (NO in Step ST3), it is concluded that duplexing is not possible (Step ST4), a version matching abnormality is outputted (Step ST5) and a single operation (not duplexed) is continued (Step ST6).

If the CPU version of the standby CPU unit is found to be equal to or larger than its own function version (YES in Step ST3), it is concluded that duplexing is possible 10 (Step ST7) and duplexed operation is started (Step ST8). In either case (Step ST4 or ST7), the conclusion is communicated to the standby CPU unit.

The CPU unit of the standby system (the standby CPU unit), after communicating its own CPU unit to the executing CPU unit (Step ST2), waits for the result of the aforementioned comparison by the executing CPU unit (Step ST9). If the result of the comparison is that duplexing is possible (YES in Step ST10), it joins the duplexed operation (Step ST8). If the result of the comparison is that duplexing is not possible (NO in Step ST10), the operation is stopped and a version matching abnormality is outputted (Step ST11). As the duplexed operation is started (Step ST8), the executing CPU unit copies the user problem stored by itself and, if necessary, parameters to a specified area of the standby CPU unit.

The support tool 10 possesses data on the CPU versions of CPU units to which it can correspond. When downloading a user program to the first CPU unit 22 of the executing system, the support tool 10 obtains the CPU version of the first CPU unit 22 and judges whether or not it is a corresponding one. The user program is downloaded only if it is judged to be a corresponding one.

Figure 9:
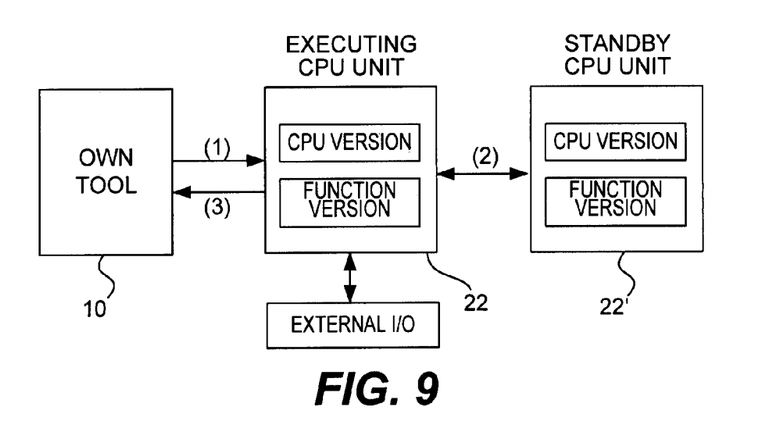
FIG. 9 is a block diagram of another system embodying this invention.

When a new function is added to the CPU units, the support tool 10 starts by checking the version data (CPU version and function version) of the first CPU unit 22, as indicated by (1) in FIG. 9. Next, the first CPU unit 22 obtains the CPU version of the second CPU unit 22' and determines which CPU version is larger (as indicated by (2) in FIG. 9) and reports the older of the CPU versions and its own function version (as indicated by (3) in FIG. 9). The reason for not comparing the function versions of the two CPU units and reporting only its own function version is that it is presumed that the two CPU units are operating on the same functions during a duplexed operation and hence their function versions should be matching.

Thus, the support tool 10 can ascertain the range of commands and settings that may be used for a duplexed PLC and prevent the user from erroneously downloading a command or setting outside the permissible range.

Although the invention was described above by way of only one example, this example is not intended to limit the scope of the invention. Many modifications and variations are possible within the scope of the invention. For example, although it was explained above that the executing CPU unit responds to a request from the support tool 10 by comparing its own CPU version and the CPU version obtained from the standby CPU unit and responds with the older of the compared version, this is not intended to limit the scope of the invention. The executing CPU unit may be arranged to report both its own CPU version and the CPU version of the standby CPU unit to the support tool 10. In such a case, the support tool 10 may be structured so as to compare the two CPU versions communicated from the executing CPU unit, compare them together and treat the older CPU version as the common CPU version for both the executing and standby CPU units.

As another example, there are different ways in which the executing CPU unit can be informed of the CPU version of the standby CPU unit other than by making a request for the CPU version from the standby CPU unit, as explained above. Alternatively, it may be so arranged that the standby CPU unit will preliminarily store its own CPU version in a memory from which the executing CPU unit can retrieve data and that the executing CPU unit will read it out therefrom, whenever necessary.

When CPU versions are stored, it may be in the system ROMs 22a and 22'a or in another rewritable memory. Function versions may be stored in the user memories UM 22d and 22'd as a part of the user program or in the IO memories 22e and 22'e.

Although it was explained above that a function version and a CPU version are compared to determine whether a duplexed operation may be possible or not but the judgment may be made by comparing the application version of the executing system with the CPU version of the standby system. Since the application version is determined by the parameter version and the function version, it may be stored, for example, in the IO memories 22e and 22'e. The application version may be stored in a non-volatile memory, like the CPU version, or may be stored temporarily in a volatile memory buffer. The parameter version and the application version may be set by the support tool, like the function version, or may be arranged to be automatically set by the CPU unit according to the set parameters and the function version. If this function of automatically setting the parameter version and the application version is implemented to the CPU unit, the application version may be obtainable, for example, when the judgment is made whether a duplexed operation is possible or not.

The process of judging whether or not duplexing is possible or not by using the application version obtained either preliminarily or at the time of judging whether a duplexed operation is possible or not may be carried out basically by replacing the function version as used in the example explained above by the application version.

It may be so arranged that the application version in the example described above is determined by the user when the user program is created and stored as a part of the user program by using the support tool.

According to another embodiment of the invention for determining application versions, application versions and a correlating table of names of functions that can be executed for each of the application versions are preliminarily stored in the CPU unit, as will be explained below with reference to FIGS. 10 and 11.

Figure 10:
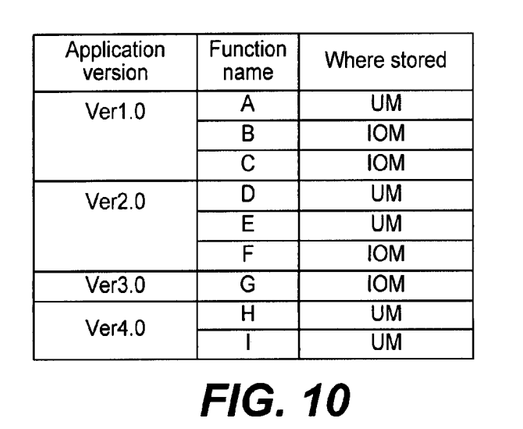
FIG. 10 is an example of application version table embodying this invention.

FIG. 10 shows an example of a table (referred to as an application version table) that shows the relationship among application versions, functions executable by each of the application versions and places where they are stored. FIG. 10 shows an example where parameters with function names B, C, F and G are stored in IOM.

Figure 11:
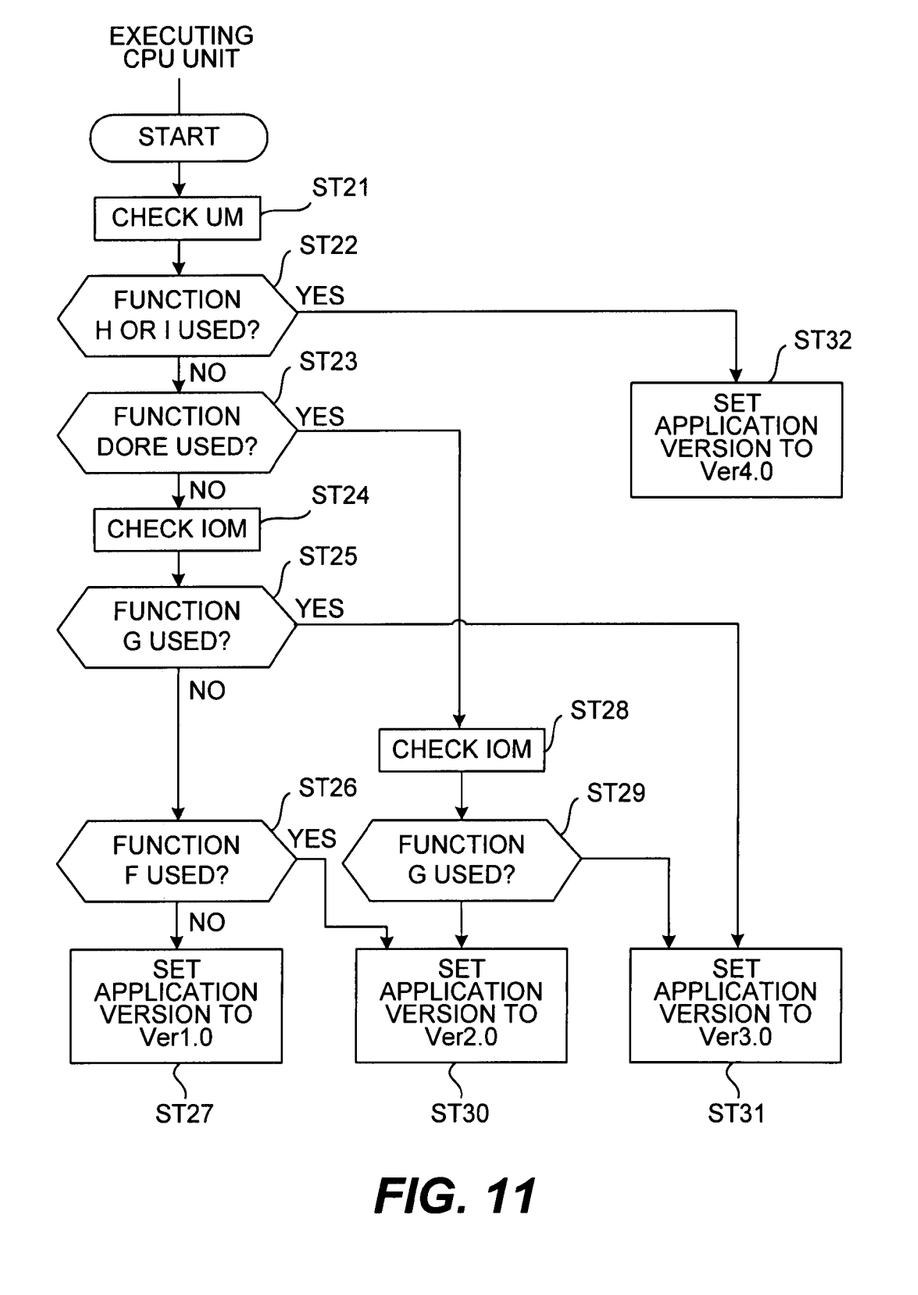
FIG. 11 is a flowchart of process for determining application versions according to this invention.

FIG. 11 shows a process for determining application versions from a user program and parameters by using the application version table of FIG. 10. The MPU of the executing CPU unit firstly checks UM (Step 21) to determine whether either of functions H and I is used in UM or not (Step S22). This may be done, for example, by referencing the user program stored in UM to determine whether any command corresponding to function H or I is used. If it is determined that function H or I is used (YES in Step ST22), application version is determined to be ver4.0 (Step ST32). If it is determined that neither function H nor I is used (NO in Step ST22), it is further checked to determine whether or not either of functions D and E is used in UM (Step ST23), say, by referencing the user program stored in UM to determine whether any command corresponding to function D or E is used. If it is determined that function D or E is used (YES in Step ST23), IOM is checked (Step ST28) to determined whether function G is used or not (Step ST ST29), say, by referencing the parameters stored in IOM to determine whether function G is used or not. If it is determined that function G is used (YES in Step ST29), application version is determined to be ver3.0 (Step ST31). If it is determined that function G is not used (NO in Step ST29), application version is determined to be ver2.0 (Step 30).

If it is determined in Step ST23 that neither function D or E is used (NO in Step ST23), IOM is checked next (Step ST24) to determined whether function G is used or not (Step ST25). If it is determined that function G is used (YES in Step 25), application version is determined to be ver3.0 (Step ST31). If it is determined that function G is not used (NO in Step ST25), it is further determined whether function F is used in IOM (Step ST26). If it is determined that function F is used (YES in Step ST26), application version is determined to be ver2.0 (Step ST30). If it is determined that function F is not used (NO in Step ST26), application version is determined to be ver1.0 (Step ST27). Application versions are determined as explained above.

What is claimed is:

1. A programmable controller comprising:

two CPU units, each of said two CPU units being adapted to know status of the other of said CPU units, one of said two CPU units functioning as an executing CPU unit and the other of said two CPU units functioning as a standby CPU unit, said standby CPU unit being adapted, when said executing CPU unit goes down, to serve as said executing CPU unit and to continue operations of said executing CPU unit, each one of said two CPU units storing a user program, user program version data based on said user program and unit version data indicative of functionality of said one CPU unit, wherein each of said two CPU units comprises:

judging means for judging, based on the unit version data of said standby CPU unit and the user program version data stored in said executing CPU unit, whether or not execution of the user program stored in said executing CPU unit is possible by said standby CPU unit; and starting means for starting a duplexed operation by said two CPU units only if said judging means judges that said execution is possible;

wherein the judging means of said executing CPU unit has the functions of:

obtaining the unit version data of said standby CPU unit from said standby CPU unit; and judging whether or not the user program stored in said executing CPU unit can be executed by said standby CPU unit by comparing the obtained unit version data of said standby CPU unit with said user program stored in said executing CPU unit; and wherein said executing CPU unit has the function of copying said user program stored in said executing CPU unit to said standby CPU unit together with said user program version data when starting said duplexed operation; and wherein said executing CPU unit is adapted to obtain the unit version data of said standby CPU unit, compare said obtained unit version data of said standby CPU unit with the unit version data of said executing CPU unit and to communicate an older of the compared unit version data to a support tool connected to said programmable controller.

2. The programmable controller of claim 1 wherein said user program version data and said unit version data comprise numerical data.

3. The programmable controller of claim 1 wherein said user program version data are function version data indicative of functionality of said user program.

4. The programmable controller of claim 1 wherein said user program version data are application version data defined at least by function version data indicative of functionality of said user program and parameter version data identifying levels of parameters set in said CPU units.

5. A programmable controller system comprising:

a programmable controller; and a support tool which is connected to said programmable controller;

wherein said programmable controller comprises two CPU units, each of said two CPU units being adapted to know status of the other of said CPU units, one of said two CPU units functioning as an executing CPU unit and the other of said two CPU units functioning as a standby CPU unit, said standby CPU unit being adapted, when said executing CPU unit goes down, to serve as said executing CPU unit and to continue operations of said executing CPU unit, each one of said two CPU units storing a user program, user program version data based on said user program and unit version data indicative of functionality of said one CPU unit;

wherein each of said two CPU units comprises judging means for judging, based on the unit version data of said standby CPU unit and the user program version data stored in said executing CPU unit, whether or not execution of the user program stored in said executing CPU unit is possible by said standby CPU unit, and starting means for starting a duplexed operation by said two CPU units only if said judging means judges that said execution is possible;

wherein the judging means of said executing CPU unit has the functions of obtaining the unit version data of said standby CPU unit from said standby CPU unit and judging whether or not the user program stored in said executing CPU unit can be executed by said standby CPU unit by comparing the obtained unit version data of said standby CPU unit with said user program stored in said executing CPU unit;

wherein said executing CPU unit has the function of copying said user program stored in said executing CPU unit to said standby CPU unit together with said user program version data when staffing said duplexed operation;

wherein said executing CPU unit is adapted to obtain the unit version data of said standby CPU unit, compare said obtained unit version data of said standby CPU unit with the unit version data of said executing CPU unit and to communicate an older of the compared unit version data to said support tool; and wherein said support tool serves to issue to said programmable controller a request for said older of said compared unit version data.

* * * * *